United States Patent [19]

Scott

[11] 4,338,507
[45] Jul. 6, 1982

[54] WATER-QUENCHED COLLECTION SYSTEM FOR USE WITH A PLASMA-ARC TORCH

[75] Inventor: William B. Scott, Rochelle, Ill.

[73] Assignee: W. A. Whitney Corp., Rockford, Ill.

[21] Appl. No.: 116,319

[22] Filed: Jan. 28, 1980

[51] Int. Cl.³ .............................................. B23K 9/00
[52] U.S. Cl. ......................... 219/121 PC; 219/137.41;
219/121 PN; 219/121 P; 266/49; 228/160;
55/256
[58] Field of Search .................. 219/137.41, 121P, 68,
219/73, 158; 266/49, 65, 50, 146, 147; 148/9;
228/125, 160; 55/255, 256, 241

[56] References Cited

U.S. PATENT DOCUMENTS

| | | | |
|---|---|---|---|
| 2,030,050 | 2/1936 | Coberly | 266/49 X |
| 2,132,110 | 10/1938 | Holler | 266/49 X |
| 2,380,188 | 7/1945 | O'Connor | 266/49 X |
| 3,486,744 | 12/1969 | Beyers et al. | 266/49 |
| 3,743,259 | 7/1973 | Hennelly | 266/49 |
| 3,743,260 | 7/1973 | Alleman et al. | 266/49 |
| 4,063,059 | 12/1977 | Brolund et al. | 219/68 |
| 4,143,860 | 3/1979 | Herbener | 266/49 |

FOREIGN PATENT DOCUMENTS

| | | | |
|---|---|---|---|
| 137675 | 9/1979 | German Democratic Rep. | 219/121 P |
| 51-22641 | 2/1976 | Japan | 266/49 |
| 57046 | 8/1977 | U.S.S.R. | 219/137.41 |

*Primary Examiner*—B. A. Reynolds
*Assistant Examiner*—M. H. Paschall
*Attorney, Agent, or Firm*—Leydig, Voit, Osann, Mayer & Holt, Ltd.

[57] ABSTRACT

Molten metal, slag and fumes created during the operation of a plasma-arc torch are discharged downwardly into a duct whose lower end is immersed in a tank of water. A stream of water is directed down the entire inner periphery of the duct and serves to cool and wash the duct. Fumes passing downwardly within the duct are directed into the tank and are quenched and cooled before bubbling upwardly into and being sucked from a housing which surrounds the lower end portion of the duct.

13 Claims, 3 Drawing Figures

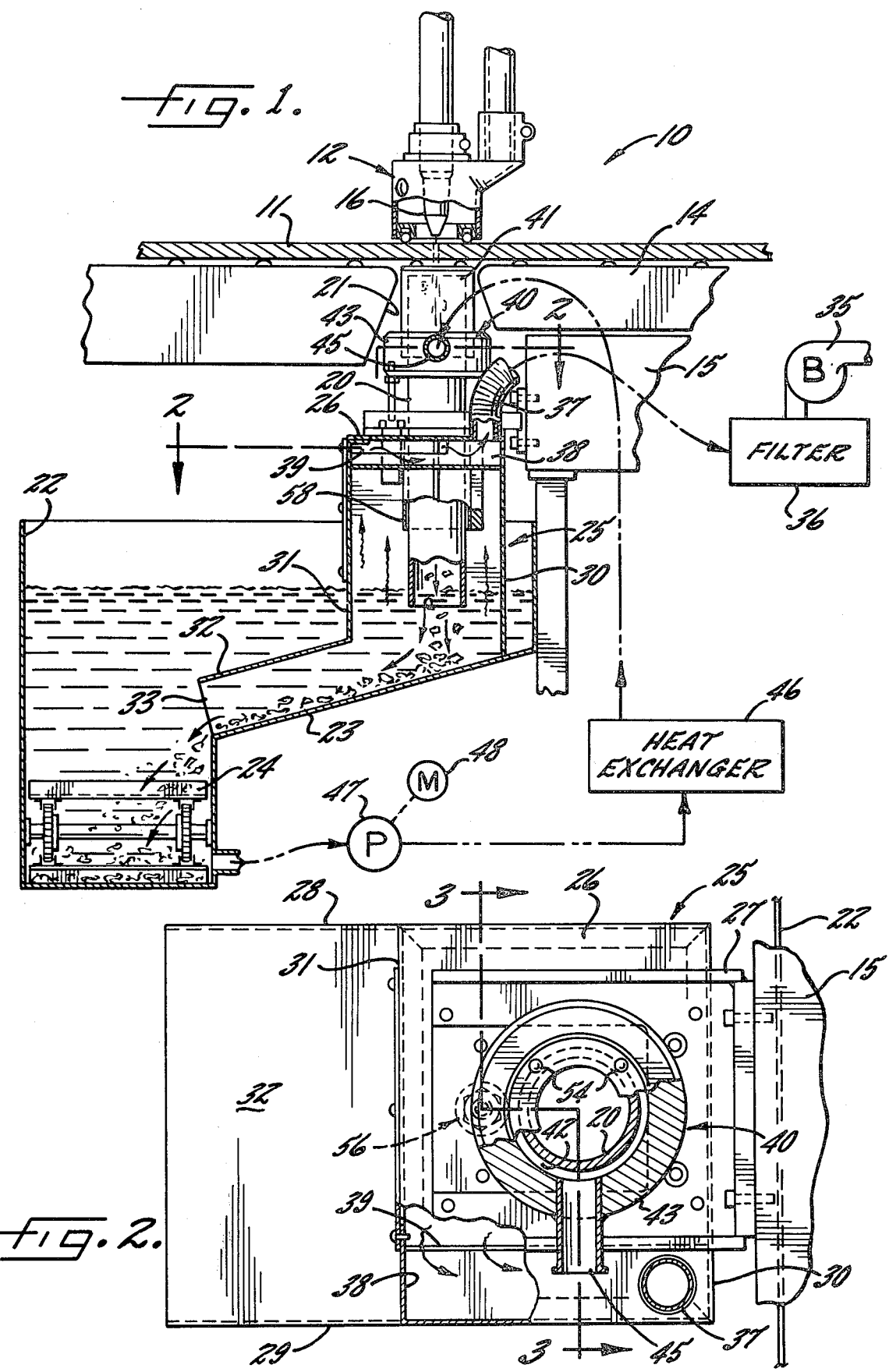

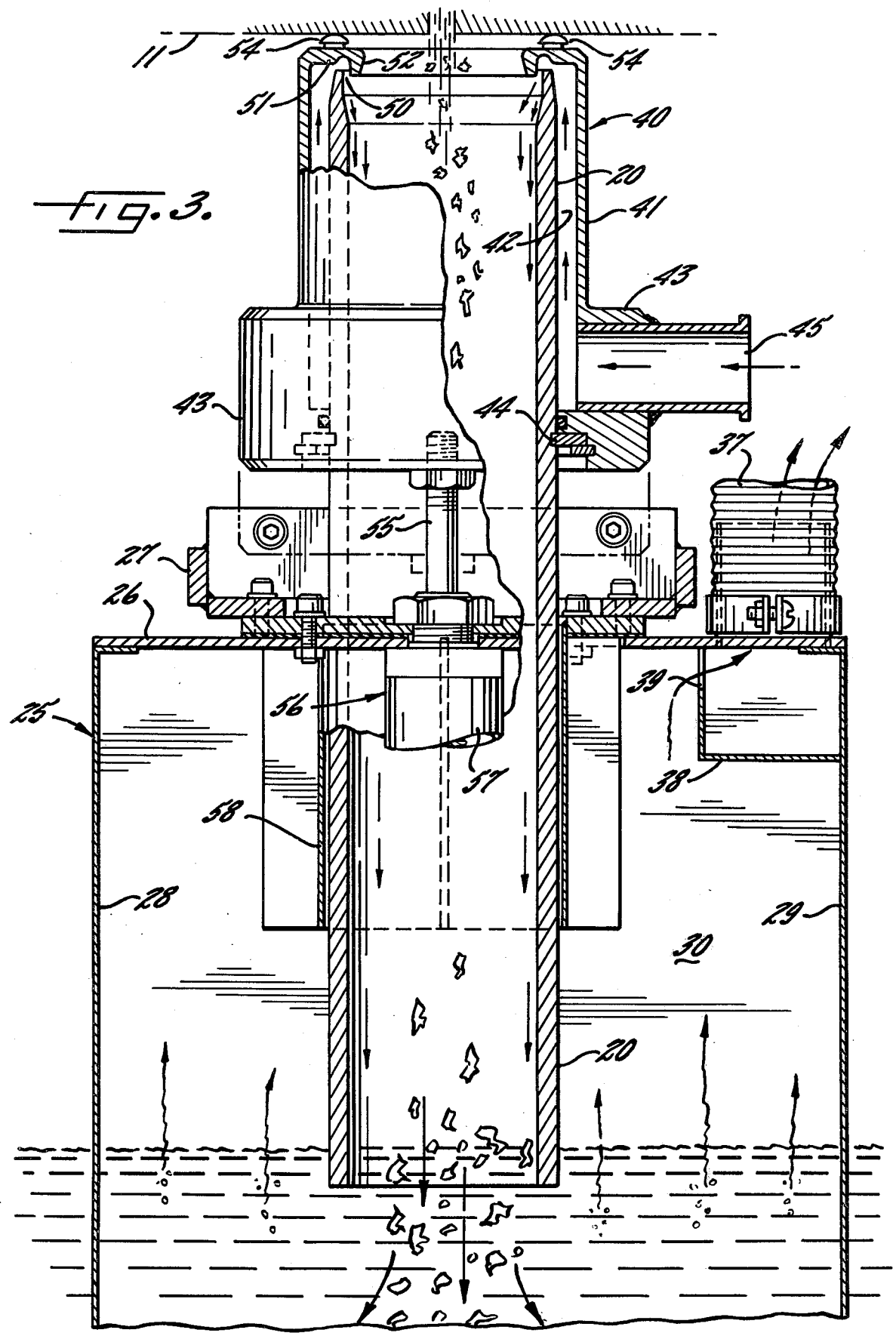

WATER-QUENCHED COLLECTION SYSTEM FOR USE WITH A PLASMA-ARC TORCH

BACKGROUND OF THE INVENTION

This invention relates to apparatus for cutting a metal workpiece by melting the workpiece with a melting tool such as a plasma-arc torch. Such a torch operates by ionizing a column of gas with an electric arc to produce temperatures up to 30,000 degrees F. A high velocity, high temperature plasma stream and electric arc strike the workpiece with the heat serving to melt the metal while the high velocity stream blows away the molten metal.

Apparatus which utilizes a plasma-arc torch is disclosed in Brolund et al U.S. Pat. No. 4,063,059. In the apparatus disclosed in that patent, a duct is disposed beneath the workpiece in alinement with the torch. Molten metal falls downwardly into the duct while fumes are sucked into the duct and away from the work area by an exhaust system. Prior to the fumes being discharged from the exhaust system, foreign particles are filtered from the fumes in order to provide a relatively clean discharge to atmosphere.

The apparatus disclosed in the Brolund et al patent functions adequately under certain circumstances. When the torch, however, is operated substantially continuously over a long period of time, the heavy and prolonged flow of the plasma stream and the molten metal into the duct causes the duct to get so hot that holes may be burned in the duct and welds may be broken loose. In addition, the molten metal tends to build up within the duct as slag and tends to clog the duct. In some cases, the fumes sucked out of the duct are extremely hot and contain so many particles that the filter becomes clogged in a relatively short period of time.

SUMMARY OF THE INVENTION

The general aim of the present invention is to provide new and improved apparatus of the above general type in which the duct is continuously cooled, in which slag is flushed off of the inside of the duct and in which the fumes are quenched and preliminarily cleaned prior to being sucked through the filter.

A more detailed object is to achieve the foregoing by providing apparatus in which the duct discharges the molten metal into an underlying tank of liquid. The upper end portion of the duct is surrounded by a jacket. Liquid from the tank is pumped into the jacket and then is uniquely discharged into the duct to cool the duct and to wash slag from the inside of the duct. In order to quench and clean the fumes, the lower end of the cut is immersed in the liquid in the tank and is surrounded by a housing. Fumes passing downwardly within the duct are directed into the liquid and are quenched and cleaned before bubbling up into the housing and being sucked into the filter.

The invention also resides in the relatively simple and inexpensive construction of the apparatus and in the unique construction of the duct and the jacket to restrict fumes from rising upwardly within the duct.

These and other objects and advantages of the invention will become more apparent from the following detailed description when taken in conjunction with the accompanying drawings.

BRIEF DESCRIPTION OF THE DRAWINGS

FIG. 1 is a fragmentary front elevational view of new and improved apparatus incorporating the unique features of the present invention, part of the apparatus being broken away and shown in section.

FIG. 2 is an enlarged fragmentary cross-section taken substantially along the line 2—2 of FIG. 1.

FIG. 3 is an enlarged fragmentary cross-section taken substantially along the line 3—3 of FIG. 2.

DETAILED DESCRIPTION OF THE PREFERRED EMBODIMENT

The present invention is shown in the drawings in connection with apparatus 10 for cutting holes and irregular shaped openings in a sheet metal workpiece 11 through the use of a metal melting tool 12 operable to emit downwardly directed energy for melting the workpiece. The workpiece is disposed in a horizontal plane and is supported on a table 14 which, in turn, is supported on an underlying bed or bolster 15.

In the present instance, the metal melting tool 12 is a plasma-arc torch. Plasma-arc torches such as the torch 12 are commercially available as, for example, from Thermal Dynamics Corporation of West Lebanon, N.H. Basically, such a torch includes a tip 16 defining a small orifice through which an ionized column of gas and an electric arc are forced. The plasma stream and the electric arc are discharged from the orifice at high velocity and produce extremely high temperatures to cause instantaneous melting of the underlying portion of the workpiece 11 and to blast the molten metal downwardly from the workpiece. This process makes a clean, high speed cut and is generally accepted as the preferred method of cutting sections up to 6" thick from stainless steel and non-ferrous or clad metals that are not easily cut by oxygen fuel gas processes. A more detailed disclosure of apparatus equipped with a plasma-arc torch is set forth in Brolund et al U.S. Pat. No. 4,063,059.

During operation of the torch 12, hot fumes and molten metal are produced. The molten metal is disposed of beneath the table 14 of the apparatus 10 while the fumes are disposed of by means of an exhaust system.

More specifically, the molten metal and the fumes resulting from the cutting operation are directed into an upright tubular duct 20 (FIG. 3) which extends upwardly into a gap 21 (FIG. 1) in the table 14 and which is located in vertical alinement with the tip 16 of the torch 12. The duct is made of sheet metal and is generally cylindrical in shape.

In accordance with the present invention, the duct 20 is continuously cooled with liquid which, in addition to cooling the duct, serves to wash slag off of the inside of the duct. Moreover, the liquid is used to quench and preliminarily clean the fumes before the fumes pass through the exhaust system.

In the present instance, the liquid which is used is water. A relatively large reservoir or bath of water is contained in a sheet metal tank 22 (FIG. 1) which is secured to the bolster 15. One section 23 of the bottom wall of the tank underlies the duct 20 and is inclined downwardly. Molten metal and slag discharged from the lower end of the duct 20 gravitate down the inclined bottom wall 23 to a power-driven drag conveyor 24 located at the bottom of the tank. The conveyor carries the metal and slag out of the tank to a disposal area, the metal and slag being cooled by the water in the tank.

Located above the inclined bottom wall 23 of the tank 22 is a box-like housing 25 made of sheet metal and having an open bottom. The housing includes a top wall 26 (FIG. 3) secured to a mounting bracket 27 which, in turn, is fastened to the bolster 15. Three vertical walls 28, 29 and 30 of the housing terminate very close to the bottom wall 23 of the tank while the remaining vertical wall 31 terminates well short of the bottom wall 23. A hood 32 extends from the walls 28, 29 and 31 and coacts with the bottom wall 23 to define a chute 33 for the metal and slag. The chute and the lower end portion of the housing 25 are submerged in the water in the tank 22.

The duct 20 extends upwardly through the top wall 26 of the housing 25 and its upper end is located adjacent the lower side of the workpiece 11. In carrying out the invention, the lower end of the duct is immersed a short distance (e.g., ½ inch) into the water in the tank 22. As a result, fumes discharged downwardly through the duct pass into the water and are quenched. Also, particles are cleaned from the fumes by the water.

After being discharged from the duct 20 and into the water, the fumes bubble up from the water and into an elcosure which herein is defined by the housing 25, that is to say, the quenched and cleaned fumes come out of solution. The fumes are removed from the housing 25 and are discharged to atmosphere by a blower 35 which sucks the fumes through a filter 36 and a flexible hose 37. The latter is connected to the top wall 26 of the housing 25 and communicates with a box-like plenum 38 (FIG. 3) formed adjacent the top wall 26 and the vertical wall 29. Fumes pass from the housing and into the plenum through an opening 39 formed in one side of the plenum.

With the foregoing arrangement, the fumes discharged out of the duct 20 are quenched and preliminarily cleaned before the fumes are sucked through the filter 36. As a result, the filter is subjected to less clogging and, in addition, the discharge to the atmosphere is relatively cool. The housing 25 coacts with the water in the tank 22 to establish a water seal around the lower end portion of the housing and, because the duct 20 is immersed only a short distance into the water, virtually all of the fumes bubble upwardly into the housing for subsequent removal by the blower 35. There is virtually no discharge of fumes through the lower end of the chute 33.

Further in carrying out the invention, a water jacket 40 (FIG. 3) surrounds the upper end portion of the duct 20. Water is circulated through the jacket to cool the duct and then is directed downwardly inside the duct to further cool the duct and to wash slag out of the duct.

More specifically, the water jacket 40 includes a cylindrical sleeve 41 (FIG. 3) which surrounds the upper end portion of the duct 20. The sleeve 41 is spaced radially outwardly from the outer side of the duct and thus an annular passage 42 is defined between the sleeve and the duct.

Formed on the lower end of the sleeve 41 is a collar 43 (FIG. 3) which is rigidly secured to the duct 20 at 44. A conduit 45 extends into the collar and communicates with the passage 42. The conduit also communicates with the tank 22 by way of a heat exchanger 46 (FIG. 1) and a pump 47, the latter being driven by a motor 48.

An annular outlet 50 (FIG. 3) is formed at the upper ends of the sleeve 41 and the duct 20 to permit water in the passage 42 to be directed into the duct. Herein, the outlet is defined by a wall 51 extending inwardly from the upper end of the sleeve 41 and overhanging the upper end of the duct 20. Depending from the wall 51 is an annular lip 52 which projects downwardly a short distance into the duct in radially spaced relation from the inner side of the duct.

With the foregoing arrangement, water is pumped from the tank 22 and is delivered to and cooled by the heat exchanger 46. The cooled water then is pumped into the water jacket 40 and circulates through the passage 42 to cool the duct 20. A continuous spray of water is discharged out of the outlet 50 and streams downwardly along the inside of the duct to further cool the duct and to flush slag off of the inside of the duct. Thus, the slag is prevented from building up in and clogging the duct.

As shown in FIG. 3, angularly spaced projections 54 extend upwardly from the wall 51 of the water jacket 40 and engage the underside of the workpiece 11 to support the latter. Air is induced to flow radially between the projections 54 and downwardly into the duct 20 by the water being sprayed from the outlet 50. Such air tends to keep the fumes from rising upwardly within the duct and tends to force the fumes downwardly into the water in the tank 22.

As disclosed in the aforementioned Brolund et al patent, it is desirable to be able to lower the projections 54 out of engagement with the workpiece 11. For this purpose, the rod 55 (FIG. 3) of a pneumatic actuator 56 is connected to the collar 43 of the water jacket 40 while the cylinder 57 of the actuator is connected to the top wall 26 of the housing 25. When the rod is advanced and retracted, the water jacket 40 is moved upwardly and downwardly, respectively, as shown in full and broken lines in FIG. 3 so as to raise and lower the projections 54. The duct 20 moves upwardly and downwardly with the water jacket 40 and is guided for up and down sliding by a sleeve 58 which depends from the top wall 26 of the housing 25.

It will be apparent from the foregoing that the present invention brings to the art new and improved apparatus 10 in which the molten metal, slag and fumes created during the operation of a plasma-arc torch 12 are delivered into a duct 20 which is uniquely immersed in a tank 22 of water. The fumes are quenched and cleaned by the water and, in addition, the water is used to cool and wash the duct.

What is claimed is:

1. Apparatus for cutting a metal workpiece, said apparatus comprising a metal melting tool located above the workpiece and operable to emit downwardly directed energy for melting the workpiece, and an upright tubular duct located below the workpiece and aligned vertically with said tool whereby molten metal is directed downwardly into said duct, the improvement in said apparatus comprising, a tank of liquid located below the workpiece, the lower end of said duct being located in proximity to the liquid in said tank, a jacket surrounding the upper portion of said duct and providing a space for liquid in cooling relationship with the outside of said duct, means for pumping liquid from said tank and into said space provided by said jacket, and an annular outlet at the upper ends of said duct and said jacket and opening downwardly into the inside of said duct whereby the liquid pumped into said jacket is discharged out of said outlet and streams downwardly along the inside of the duct to cool the duct and to flush molten metal from the duct and into the tank.

2. Apparatus as defined in claim 1 in which said jacket includes an annular lip projecting downwardly into the upper end portion of said duct and spaced inwardly from said duct, said outlet being defined between said lip and the upper end portion of said duct.

3. Apparatus as defined in claim 1 in which said jacket comprises a sleeve spaced outwardly from and surrounding the upper end portion of said duct, a wall at the upper end of said sleeve and extending inwardly across and above the upper end of said duct, and a lip depending from said wall and into the upper end portion of said duct in inwardly spaced relation therefrom, said outlet being defined between the outer side of said lip and the inner side of the upper end portion of said duct.

4. Apparatus as defined in claim 1 in which the lower end of said duct is immersed in the liquid in said tank.

5. Apparatus as defined in claim 4 further including a housing spaced outwardly from and surrounding the lower end portion of said duct, said housing having a closed upper end located above the level of the liquid in the tank and having a lower end immersed in the liquid in the tank, and means for exhausting gas from the space between said housing and the lower end portion of said duct.

6. Apparatus as defined in claim 5 in which the lower end of said housing is open so as to permit metal to fall out of said duct and into said tank.

7. Apparatus for cutting a metal workpiece, said apparatus comprising a metal melting tool located above the workpiece and operable to emit downwardly directed energy for melting the workpiece, and an upright tubular duct located below the workpiece and aligned vertically with said tool whereby molten metal is directed downwardly into said duct, the improvement in said apparatus comprising, a tank of liquid located below the workpiece, the lower end of said duct being immersed in the liquid in said tank, a housing spaced outwardly from and surrounding the lower end portion of said duct, said housing having a closed upper end located above the level of the liquid in the tank and having a lower end immersed in the liquid in the tank, and means for exhausting gas from the space between said housing and the lower end portion of said duct.

8. Apparatus as defined in claim 7 in which the lower end of said housing is open so as to permit metal to fall out of said duct and into said tank.

9. Apparatus as defined in claim 7 further including a jacket surrounding the upper end portion of said duct, means for pumping liquid from said tank and into said jacket, and an annular outlet at the upper ends of said duct and said jacket and opening downwardly into the inside of said duct whereby the liquid pumped into said jacket is discharged out of said outlet and streams along the inside of the duct to cool the duct and to flush molten metal from the duct and into the tank.

10. Apparatus for cutting a metal workpiece, said apparatus comprising a metal melting tool located above the workpiece and operable to emit downwardly directed energy for melting the workpiece, and an upright tubular duct located below the workpiece and alined vertically with said tool whereby molten metal is directed downwardly into said duct, the improvement in said apparatus comprising, a tank of liquid located below the workpiece, the lower end of said duct being immersed in the liquid in said tank, a jacket surrounding the upper end portion of said duct, means for pumping liquid from said tank and into said jacket, an annular outlet at the upper ends of said duct and said jacket and opening downwardly into the inside of said duct whereby the liquid pumped into said jacket is discharged out of said outlet and streams along the inside of the duct to cool the duct and to flush molten metal from the duct and into the tank, a housing spaced outwardly from and surrounding the lower end portion of said duct, said housing having a closed upper end located above the level of the liquid in the tank and having an open lower end immersed in the liquid in the tank, and means for exhausting gas from the space between said housing and the lower end portion of said duct.

11. Apparatus as defined in claim 10 in which said jacket comprises a sleeve spaced outwardly from and surrounding the upper end portion of said duct, a wall at the upper end of said sleeve and extending inwardly across and above the upper end of said duct, and a lip depending from said wall and into the upper end portion of said duct in inwardly spaced relation therefrom, said outlet being defined between the outer side of said lip and the inner side of the upper end portion of said duct.

12. Apparatus for cutting a metal workpiece, said apparatus comprising a metal melting tool located above the workpiece and operable to emit downwardly directed energy for melting the workpiece, and an upright tubular duct located below the workpiece and alined vertically with said tool whereby molten metal is directed downwardly into said duct, the improvement in said apparatus comprising, a reservoir of liquid located below the workpiece, the lower end of said duct being located in proximity to the liquid in said reservoir, side walls defining an enclosure around the sides of said duct, a top wall spaced above the level of the liquid in the reservoir and closing the top of said enclosure, and means for exhausting gas from the space within said enclosure.

13. Apparatus for cutting a metal workpiece, said apparatus comprising a metal melting tool located above the workpiece and operable to emit downwardly directed energy for melting the workpiece, and an upright tubular duct located below the workpiece and alined vertically with said tool whereby molten metal is directed downwardly into said duct, the improvement in said apparatus comprising, a reservoir of liquid located below the workpiece, the lower end of said duct being located in proximity to the liquid in said reservoir, means for pumping liquid from said reservoir, outlet means at the upper end portion of said duct and communicating with said pumping means, said outlet means opening into said duct around the upper end portion thereof whereby liquid pumped from said reservoir is discharged out of said outlet means and flows downwardly along the inside of the duct around the circumference thereof to cool the duct and to flush molten metal from the duct and into the reservoir, side walls defining an enclosure around the sides of said duct, a top wall spaced above the level of the liquid in the reservoir and closing the top of said enclosure, and means for exhausting gas from the space within said enclosure.

* * * * *